(12) United States Patent
Woo et al.

(10) Patent No.: US 12,264,086 B2
(45) Date of Patent: Apr. 1, 2025

(54) FILTER FOR WATER-PURIFICATION DEVICE AND WATER-PURIFICATION DEVICE INCLUDING THE SAME

(71) Applicant: LG Electronics Inc., Seoul (KR)

(72) Inventors: Suhye Woo, Seoul (KR); Sangduck Lee, Seoul (KR); Yuseung Choi, Seoul (KR); Uison Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/241,558

(22) Filed: Sep. 1, 2023

(65) Prior Publication Data

US 2023/0406727 A1    Dec. 21, 2023

Related U.S. Application Data

(63) Continuation of application No. 17/241,799, filed on Apr. 27, 2021, now Pat. No. 11,780,748.

(30) Foreign Application Priority Data

May 6, 2020    (KR) .................. 10-2020-0053930

(51) Int. Cl.
*C02F 1/28*    (2023.01)
*B01J 20/02*    (2006.01)
(Continued)

(52) U.S. Cl.
CPC ........... *C02F 1/288* (2013.01); *B01J 20/0211* (2013.01); *B01J 20/041* (2013.01); *B01J 20/06* (2013.01);
(Continued)

(58) Field of Classification Search
CPC .... B01D 35/30; B01D 46/2411; B01D 46/12; B01D 29/58; B01D 29/56; B01D 29/52;
(Continued)

(56) References Cited

U.S. PATENT DOCUMENTS 5,997,829 A    12/1999    Sekine et al.
9,033,158 B2    5/2015    Yoshinobu et al.
(Continued)

FOREIGN PATENT DOCUMENTS

JP    2003311263 A    * 11/2003    .............. C02F 1/002
KR    2005-0072120 A    7/2005
(Continued)

OTHER PUBLICATIONS

Machine generated translation of JP-2003311263-A (Year: 2003).*
(Continued)

*Primary Examiner* — Magali P Slawski
*Assistant Examiner* — Bernadette Karen McGann
(74) *Attorney, Agent, or Firm* — Fish & Richardson P.C.

(57) ABSTRACT

A filter for a water-purification device includes a filter housing having a water inlet and a water outlet defined therein, and a filter member disposed in the filter housing to purify water introduced through the inlet and supply the purified water to the outlet. The filter member includes a carbon block produced by mixing 40 to 50% by weight of titanium oxide, 30 to 40% by weight of activated carbon, and 18 to 23% by weight of binder with each other.

20 Claims, 8 Drawing Sheets

(51) Int. Cl.
*B01J 20/04* (2006.01)
*B01J 20/06* (2006.01)
*B01J 20/28* (2006.01)
*B01J 20/30* (2006.01)
*B01J 45/00* (2006.01)
*C02F 1/00* (2023.01)
*C02F 1/42* (2023.01)
*C02F 101/10* (2006.01)
*C02F 101/12* (2006.01)
*C02F 101/20* (2006.01)
*C02F 101/22* (2006.01)

(52) U.S. Cl.
CPC ... *B01J 20/28026* (2013.01); *B01J 20/28042* (2013.01); *B01J 20/2805* (2013.01); *B01J 20/3007* (2013.01); *B01J 20/3035* (2013.01); *B01J 20/3042* (2013.01); *B01J 45/00* (2013.01); *C02F 1/003* (2013.01); *C02F 1/281* (2013.01); *C02F 1/283* (2013.01); *C02F 1/42* (2013.01); *C02F 2001/422* (2013.01); *C02F 2101/103* (2013.01); *C02F 2101/12* (2013.01); *C02F 2101/203* (2013.01); *C02F 2101/206* (2013.01); *C02F 2101/22* (2013.01)

(58) Field of Classification Search
CPC ............... B01D 29/54; B01D 2265/06; B01D 46/0002; B01D 46/62; B01D 46/58; B01D 46/56; B01D 46/64; B01D 46/60; B01D 29/50; B01D 35/301; B01D 35/303; B01D 2201/30; B01D 24/002; B01D 24/007; B01D 24/008; B01D 24/004; B01D 39/2079; B01D 2239/0618; B01D 2239/086; B01D 39/2062; B01D 39/1607; C02F 1/001; C02F 9/00; C02F 2301/08; C02F 2201/002; C02F 2201/006; C02F 2201/003; C02F 2201/00; C02F 2201/007; C02F 1/288; C02F 1/003; C02F 1/281; C02F 1/283; C02F 1/42; C02F 2001/422; C02F 2101/103; C02F 2101/12; C02F 2101/203; C02F 2101/206; C02F 2101/22; C02F 2101/20; C02F 2307/10; C02F 2307/12; C02F 1/44; C02F 2101/36; B01J 20/0211; B01J 20/041; B01J 20/06; B01J 20/28026; B01J 20/28042; B01J 20/2805; B01J 20/3007; B01J 20/3035; B01J 20/3042; B01J 45/00; B01J 20/20; B01J 20/2803

See application file for complete search history.

(56) References Cited

U.S. PATENT DOCUMENTS

| | | | |
|---|---|---|---|
| 2005/0167358 | A1 | 8/2005 | Taylor et al. |
| 2006/0091079 | A1* | 5/2006 | Meng .................. B01J 20/0211 210/688 |
| 2011/0229395 | A1* | 9/2011 | Al-Zeghayer ........... B01J 35/39 502/437 |
| 2015/0266751 | A1 | 9/2015 | Arita et al. |
| 2019/0389740 | A1* | 12/2019 | Choi .................. B01D 39/1692 |

FOREIGN PATENT DOCUMENTS

| | | | | |
|---|---|---|---|---|
| KR | 201900081486 | A | * 7/2019 | |
| WO | WO-2018106031 | A1 | * 6/2018 | ............. B01D 35/04 |
| WO | WO-2019146910 | A1 | * 8/2019 | ............. B01D 35/04 |

OTHER PUBLICATIONS

Machine generated translation of KR 20190081486 A (Year: 2019).*
Office Action in European Appln. No. 21172104.8, mailed on Sep. 6, 2024, 5 pages.
Office Action in Korean Appln. No. 10-2023-0137124, mailed on Oct. 11, 2024, 10 pages.

* cited by examiner

| Filter type | Features | Conventional filter | Present filter |
|---|---|---|---|
| Pre-carbon block filter | Outer diameter | 41.5 mm | 43.5 mm |
| | Inner diameter | 21.5 mm | 9.5 mm |
| | Length | 149.5 mm | 149.5 mm |
| | Activated carbon | 43 wt% | 35 ~ 40 wt% |
| | Binder | 24 wt% | 20 wt% |
| | Heavy metal removal material | Iron hydroxide 33 wt% | Titanium oxide 40 ~ 45 wt% |
| | Non-woven fabric | Single layer | Single layer |

FIG. 8

| | Total | Activated carbon | Binder | Heavy metal removal material |
|---|---|---|---|---|
| | | | | Titanium dioxide |
| Weight(g) | 135g | 48g | 27g | 60g |
| Content based on total weight(%) | 100wt% | 35.5wt% | 20wt% | 44.5wt% |
| Content based on weight of activated carbon | | 1 | 0.2 | 1.25 |

FIG. 9

FIG. 10

FILTER FOR WATER-PURIFICATION DEVICE AND WATER-PURIFICATION DEVICE INCLUDING THE SAME

CROSS-REFERENCE TO RELATED APPLICATION

This application is a continuation of U.S. application Ser. No. 17/241,799, filed on Apr. 27, 2021, which claims a benefit under 35 U.S.C. § 119(a) of Korean Patent Application No. 10-2020-0053930, filed on May 6, 2020, at the Korean Intellectual Property Office, the entire disclosures of which are incorporated herein by reference for all purposes.

BACKGROUND

A water-purification device refers to a device for purifying raw-water such as tap water or groundwater. That is, the water-purification device refers to a device for converting raw-water into drinking water through various water purification methods.

In order to produce purified water, processes such as precipitation, filtration, and sterilization may be performed, and harmful substances are generally removed through such a process.

In general, a water-purification device may be including various filters to purify raw-water. These filters may be classified into sediment filters, activated carbon filters, UF hollow fiber membrane filters, and RO membrane filters according to their functions.

The sediment filter may refer to a filter for sedimentation of contaminants or suspended solids having large particles in the raw-water. The activated carbon filter may be referred to as a filter for adsorbing and removing contaminants having small particles, residual chlorine, volatile organic compounds, or odor-generating factors.

Further, the device may generally have two activated carbon filters. That is, a pre-activated carbon filter may be disposed on a raw-water side and a-post activated carbon filter may be disposed on a purified-water side. The post-activated carbon filter may be configured to improve water taste by removing odor-causing substances that mainly affect the taste of purified water.

Further, it is common that the UF hollow fiber membrane filter and the RO membrane filters are selectively used.

Recently, the demand for water-purification devices has been remarkably increased. Therefore, various requirements have occurred and thus it is difficult to satisfy them at the same time.

In one example, when applying the RO membrane filter, it is possible to remove heavy metals but it is difficult to secure a purified-water flow rate. That is, a lot of time is required to obtain an amount of the purified water as desired.

On the other hand, when using the UF hollow fiber membrane filter, it is possible to secure a high flow rate. However, since it is difficult to remove heavy metals in water, it is difficult to use groundwater or tap water in a contaminated area as the raw-water.

Therefore, both of the removal of heavy metals and securing the high purified water flow rate may not be achieved at the same time. The reason is that it is difficult to secure a high purified water flow rate when using the RO membrane filter capable of removing the heavy metals, while it is difficult to remove heavy metals when using the UF hollow fiber membrane filter capable of securing a high purified water amount flow rate.

Further, conventionally, a heavy metal removal filter has been manufactured primarily for the removal of seven elements including arsenic (As), cadmium (Cd), lead (Pb), aluminum (Al), mercury (Hg), iron (Fe), copper (Cu) among heavy metals in water.

However, in recent years, nine elements including not only the seven elements, but also manganese (Mn), and zinc (Zn) should be removed.

However, while the conventional filter for the water-purification device secures a high purified water amount flow rate, the filer may not completely remove the seven heavy metals, and may not remove manganese (Mn), zinc (Zn), etc. in water.

Further, in the conventional case, a particle size of a binder mixed in the filter is large, such that flow resistance occurs. Further, a mixed amount of the binder is large, so that the water permeability thereof decreases. That is, an effective purified-water amount is lowered.

Further, in the conventional case, since a mixed ratio of the activated carbon and the heavy metal removal material mixed in the filter is not sufficient, the heavy metal removal ability is limited.

SUMMARY

The present disclosure proposes a filter for a water-purification device capable of removing the 7 heavy metals contained in water, as well as manganese (Mn) and zinc (Zn) from water, and proposes a water-purification device including the same.

The present disclosure proposes a filter for a water-purification device which may have a reduced manufacturing cost thereof via decrease in the number of materials to be mixed, and proposes a water-purification device including the same.

The present disclosure proposes a filter for a water-purification device which may employ a smaller particle sized binder such that the binder mixing ratio may be reduced by about a half, and proposes a water-purification device including the same.

The present disclosure proposes a filter for a water-purification device in which the particle size of the binder is reduced, the binder content is reduced, uniform dispersion is possible, and a specific surface area of the heavy metal removal material is increased accordingly, and thus the heavy metal removal performance is improved, and proposes a water-purification device including the same.

The present disclosure proposes a filter for a water-purification device in which the particle size of the binder is reduced, the binder content is reduced, and uniform dispersion is possible, and the purified water flow rate is increased accordingly, and the effective purified-water amount is improved, and proposes a water-purification device including the same.

The present disclosure proposes a filter for a water-purification device capable of removing heavy metals such as lead, mercury, arsenic, iron, aluminum, copper, and cadmium in water while securing treatment capacity and proposes a water-purification device including the same.

The present disclosure proposes a filter for a water-purification which may be directly applied to an existing water-purification device without changing a shape or an arrangement structure of the filter to be applied to the water-purification device, and proposes a water-purification device including the same.

The present disclosure proposes a filter for a water-purification device in which heterogeneous filters are arranged in one filter housing in a longitudinal direction which may reduce a volume of the filter to increase space utilization, and proposes a water-purification device including the same.

A filter for a water-purification device according to the present disclosure includes a filter housing having an inlet and an outlet, and a filter member disposed in the filter housing to purify the water introduced through the inlet and supply the purified water to the outlet, wherein the filter member includes a carbon block produced by mixing titanium oxide, activated carbon, and a binder with each other.

The filter member may include a carbon block produced by mixing 40 to 50% by weight of titanium oxide, 30 to 40% by weight of activated carbon, and 18 to 23% by weight of a binder with each other.

The binder may include polyethylene (PE).

The carbon block may have a shape of a hollow tube.

The filter member may further include an anion exchange resin non-woven fabric surrounding an outside of the carbon block.

A ratio of an inner diameter (ID) and an outer diameter OD of the carbon block may be in a range of 1:3 to 1:5.

The titanium oxide may include at least one selected from titanium dioxide or titanium hydroxide.

A filter for a water-purification device according to the present disclosure includes a filter housing including an inlet and an outlet, and a filter member disposed in the filter housing to purify water introduced through the inlet and supply the purified water to the outlet, wherein the filter member includes a carbon block produced by mixing activated carbon, binder, and titanium oxide, and the binder may include polyethylene (PE).

An average particle size of the titanium oxide may be smaller than an average particle size of the activated carbon, and the average particle size of the binder may be smaller than the average particle size of the titanium oxide.

The activated carbon may have an average particle size of 120 μm or smaller.

The average particle size of the titanium oxide may be smaller than or equal to 50 μm.

The average particle size of the binder may be smaller than or equal to 30 μm.

A filter for a water-purification device according to the present disclosure includes a filter housing including an inlet and an outlet, and a filter member disposed in the filter housing to purify water introduced through the inlet and supply the purified water to the outlet, wherein the filter member includes a carbon block produced by mixing activated carbon, binder, and titanium oxide with each other, and a mixed weight of the titanium oxide may be in a range of 120% to 140% of a mixed weight of the activated carbon.

A filter for a water-purification device according to the present disclosure includes a filter housing including an inlet and an outlet, and a filter member disposed in the filter housing to purify water introduced through the inlet and supply the purified water to the outlet, wherein the filter member includes a carbon block produced by mixing activated carbon, binder, and titanium oxide with each other, and the mixed weight of the titanium oxide may be the largest, the mixed weight of the activated carbon may be greater than the mixed weight of the binder, and the mixed weight of the binder may be the smallest.

A filter for a water-purification device according to the present disclosure includes a filter housing including an inlet and an outlet, and a filter member disposed in the filter housing to purify water introduced through the inlet and supply the purified water to the outlet, wherein the filter member includes a carbon block produced by mixing activated carbon, binder, and titanium oxide with each other, and a mixed content of the binder is in a range of 15 to 25% of a total weight of the carbon block.

A filter for a water-purification device according to the present disclosure includes a filter housing including an inlet and an outlet, and a filter member disposed in the filter housing to purify water introduced through the inlet and supply the purified water to the outlet, wherein the filter member includes a carbon block produced by mixing activated carbon, binder, and titanium oxide with each other, and a mixed weight of the binder may be in a range of 40% to 50% of a mixed weight of the titanium oxide.

The water-purification device according to the present disclosure includes the filter for the water-purification device as defined above.

The present disclosure may realize a filter for a water-purification device capable of removing the 7 heavy metals contained in water, as well as manganese (Mn) and zinc (Zn) from water, and may realize a water-purification device including the same.

The present disclosure may realize a filter for a water-purification device which may have a reduced manufacturing cost thereof via decrease in the number of materials to be mixed, and may realize a water-purification device including the same.

The present disclosure may realize a filter for a water-purification device which may improve water purification performance via microbial adsorption and ion substitution while removing heavy metals contained in raw-water, and may realize a water-purification device including the same.

The present disclosure may realize a filter for a water-purification device which the filter member accommodated inside the filter housing has a block shape, so that fine particles do not escape to the outside of the filter housing, and pores are formed evenly throughout the block, so that the contact area thereof with water is uniformly maintained, and may realize a water-purification device including the same.

The present disclosure may realize a filter for a water-purification device which may employ a smaller particle sized binder such that the binder mixing ratio may be reduced by about a half, and may realize a water-purification device including the same.

The present disclosure may realize a filter for a water-purification device in which the particle size of the binder is reduced, the binder content is reduced, uniform dispersion is possible, and a specific surface area of the heavy metal removal material is increased accordingly, and thus the heavy metal removal performance is improved, and may realize a water-purification device including the same.

The present disclosure may realize a filter for a water-purification device in which the particle size of the binder is reduced, the binder content is reduced, and uniform dispersion is possible, and the purified water flow rate is increased accordingly, and the effective purified-water amount is improved, and may realize a water-purification device including the same.

The present disclosure may realize a filter for a water-purification device capable of removing heavy metals such as lead, mercury, arsenic, iron, aluminum, copper, and cadmium in water while securing treatment capacity and may realize a water-purification device including the same.

The present disclosure may realize a water-purification device in which the water purification process is performed several times using a plurality of filters, so that the removal of various foreign substances including heavy metals may be more reliably performed.

The present disclosure may realize a filter for a water-purification which may be directly applied to an existing water-purification device without changing a shape or an arrangement structure of the filter to be applied to the water-purification device, and may realize a water-purification device including the same.

The present disclosure may realize a filter for a water-purification device in which heterogeneous filters are arranged in one filter housing in a longitudinal direction which may reduce a volume of the filter to increase space utilization, and may realize a water-purification device including the same.

DETAILED DESCRIPTIONS

Hereinafter, a specific embodiment of the present disclosure will be described in detail with reference to the drawings. However, the idea of the present disclosure is not limited to the embodiments presented below. Those skilled in the art who understand the idea of the present disclosure will be able to easily implement other embodiments included within the scope of the same idea by adding, changing, deleting components. The other embodiments may be within the scope of the present disclosure.

The drawings and the following embodiments are examples of the inventive idea. However, as long as the inventive idea is not damaged, the representations of fine parts are different between the drawings for easy understanding. A specific part may not be shown according to the drawings, or may be exaggerated according to the drawings.

Figure 1:
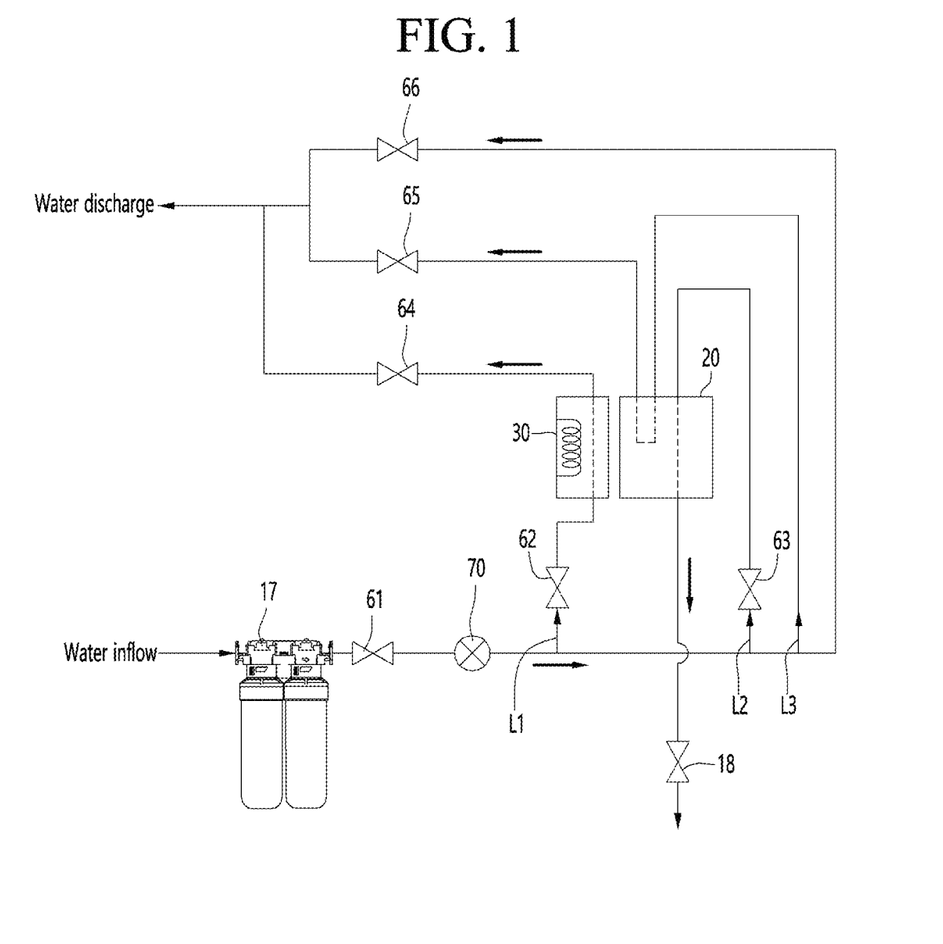
FIG. 1 is a water piping diagram of a water-purification device according to an embodiment of the present disclosure.

FIG. 1 is a water piping diagram of a water-purification device according to an embodiment of the present disclosure.

The water-purification device according to the present disclosure is configured to purify water directly supplied from an external water supply source and cool or heat the purified water and discharge the hot or cold water. In one example, the water-purification device according to the present disclosure may be a direct-type cold/hot water-purification device.

In this connection, the direct-type water-purification device refers to a water-purification device by which purified water is extracted during a user's purified-water extraction operation without a storage tank in which the purified water is stored.

Further, the water-purification device according to the present disclosure may be integrally formed with a refrigerator.

Further, the water-purification device according to the present disclosure may be embodied as an undersink type water-purification device in which a body thereof may be installed under a sink, and a water outlet thereof may be disposed outside the sink.

Referring to FIG. 1, the water-purification device according to an embodiment of the present disclosure may have a water supply line L extending from a water supply source to a water outlet of the water-purification device. Various valves and water purification parts may be connected to the water supply line L.

More specifically, the water supply line L is connected to the water supply source, such as a household faucet. A filter assembly 17 is disposed at a point along the water supply line L, so that foreign matter contained in the drinking water supplied from the water supply source is filtered by the filter assembly 17.

Further, a water supply valve 61 and a flow rate sensor 70 may be sequentially disposed at and along the water supply line L connected to the outlet of the filter assembly 17. Thus, the water supply valve 61 may be controlled to be closed when a water supply amount sensed by the flow rate sensor 70 reaches a preset amount.

Further, a water supply line L1 for hot-water supply, and a water supply line L3 for cold-water supply, and a water supply line L for cooling-water supply may be branched from a point along the water supply line L extending from the outlet of the flow rate sensor 70.

Further, a purified-water discharge valve 66 is installed at the end of the water supply line L extending from the outlet of the flow rate sensor 70. A hot-water discharge valve 64 may be disposed at the end of the water supply line L1 for supplying the hot-water. In addition, a cold-water discharge valve 65 may be installed at the end of the water supply line L3 for supplying the cold-water. A cooling-water valve 63 may be installed at a point along the water supply line L2 for supplying the cooling-water. The cooling-water valve 63 controls the amount of the cooling-water to be supplied to the cold-water production unit 20.

Further, all of the water supply lines extending from the outlets of the hot-water discharge valve 64, the cold-water discharge valve 65, and the purified-water discharge valve 66 respectively may be connected to the water outlet of the device. Further, as shown, the purified water, the cold-water and the hot-water may flow toward a single water outlet. In some cases, the purified water, the cold-water and the hot-water may flow toward independent water outlets, respectively.

Hereinafter, a cold-water and hot-water supply process will be described.

First, in the cold-water supply process, when the cooling-water valve 63 is opened and cooling-water is supplied to the cold-water production unit 20, the cold-water is produced as the water in the water supply line L3 for cold-water supply passing through the cold-water production unit 20 is cooled by the cooling-water.

In this connection, a refrigerant cycle for cooling the water may be disposed at the water supply line L2 for supplying the cooling-water. The refrigerant cycle may include a compressor, a condenser, an expansion valve, and an evaporator.

Then, when the cold-water discharge valve 65 is opened by the user pressing a cold-water selection button of a manipulation display, cold-water may be taken out through the water outlet.

In one example, in the hot-water supply process, hot-water is produced while the water flowing along the water supply line L1 for hot-water supply is heated by a water heater 30. When the hot-water discharge valve 64 is opened by the user pressing a hot-water selection button of the manipulation display, hot-water may be discharged through the water outlet.

The water-purification device according to an embodiment of the present disclosure having the configuration as described above includes at least one filter for the water-purification device in order to produce the purified water from the raw-water. The filter for the water-purification device may refer to the following description.

Hereinafter, a filter for a water-purification device according to an embodiment of the present disclosure will be described.

Figure 2:
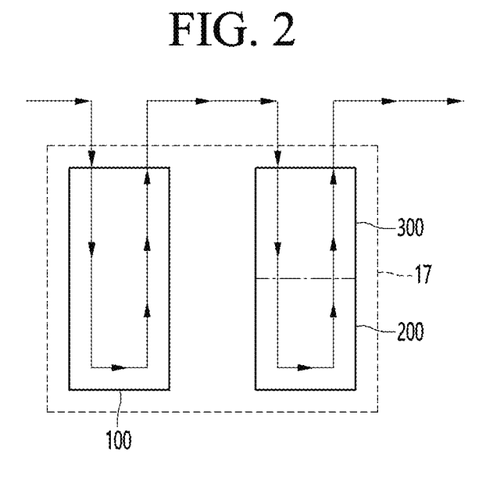
FIG. 2 is a conceptual diagram showing a filter assembly that is a part of the device according to the present disclosure.
Figure 3:
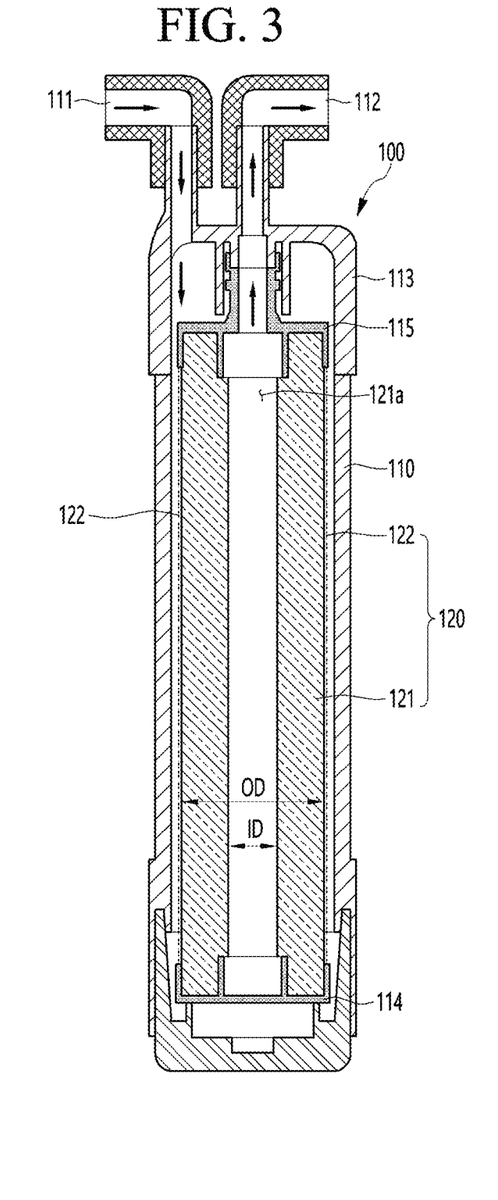
FIG. 3 is a cross-sectional view of a pre-carbon filter that is a part of the device according to the present disclosure.
Figure 4:
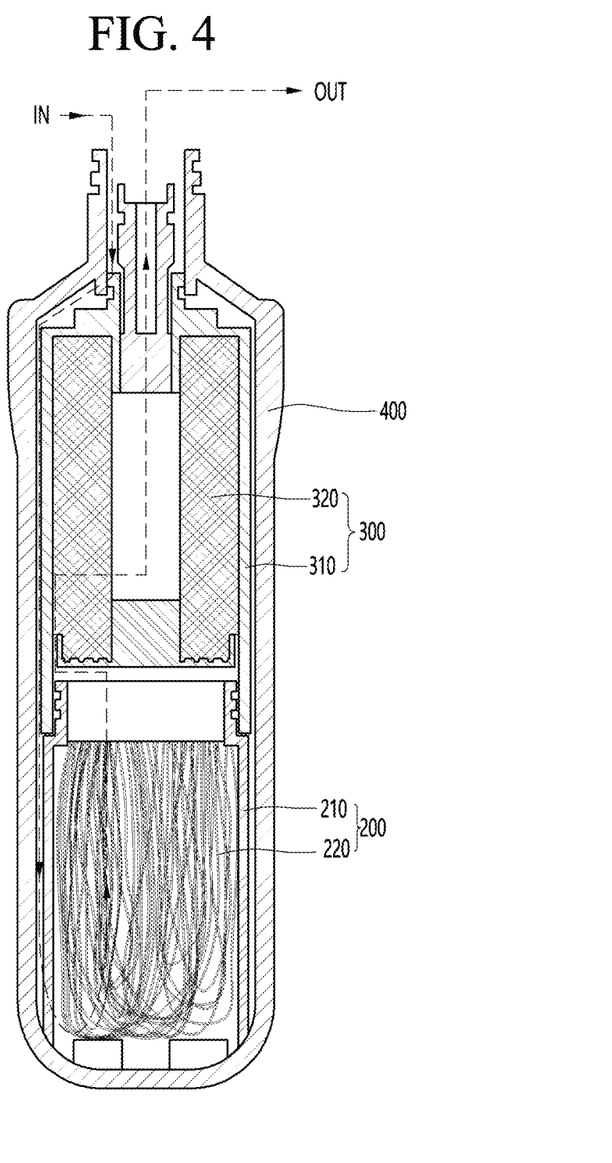
FIG. 4 is a cross-sectional view of a composite filter that is a part of the device according to the present disclosure.

FIG. 2 is a conceptual diagram showing a filter assembly that is a part of the water-purification device according to the present disclosure. FIG. 3 is a cross-sectional view of a pre-carbon filter which is a part of the water-purification device according to the present disclosure. FIG. 4 is a cross-sectional view of a composite filter which is a part of the water-purification device according to the present disclosure.

Referring to FIG. 2 to FIG. 4, a filter for a water-purification device (hereinafter, a filter assembly) according to an embodiment of the present disclosure may include at least one of a pre-carbon filter 100 in which a first carbon block 121 having a hollow tube shape is embedded, a hollow fiber membrane filter 200 in which a plurality of hollow fiber membranes 220 are embedded, and a post-carbon filter 300 in which a second carbon block 320 having a hollow tube shape is embedded.

In one example, the filter assembly 17 may include all of the pre-carbon filter 100, the hollow fiber membrane filter 200, and the post-carbon filter 300.

First, the pre-carbon filter 100 includes a filter housing 110 and a filter member 120.

The filter housing 110 includes an inlet 111 and an outlet 112. That is, water to be purified is introduced through the inlet 111, and the purified water is discharged through the outlet 112. Thus, while the water is flowing between the inlet 111 and the outlet 112, the water is purified by the filter member 120 disposed therebetween.

Further, the filter housing 110 may have a space defined therein in which the filter member 120 is accommodated, and may include an upper cap 113 having the inlet 111 and the outlet 112 formed therein. In this connection, the space of the filter housing 110 may communicate with the outside of the housing 110 through the inlet 111 and outlet 112 of the upper cap 113.

When the upper cap 113 is constructed in this way, the upper cap 113 may be opened and the filter member 120 may be easily mounted into the space of the filter housing 110, and then the filter member 120 accommodated in the filter housing 110 may be easily replaced.

Water flowing into the filter housing 110 through the inlet 111 may be purified while passing through the filter member 120. That is, foreign substances, such as heavy metals, contained in the raw-water such as tap water may be removed therefrom while the water is passing through the filter member 120.

This embodiment may provide the filter for the water-purification device having an excellent effect of removing the heavy metals from the water and provide a water-purification device having the same.

To this end, the filter member 120 may include a carbon block 121 produced by mixing titanium oxide, activated carbon, and a binder with each other, and molding the mixture into a hollow block shape.

In one example, the carbon block 121 may be produced by mixing 40 to 50% by weight of titanium oxide, 30 to 40% by weight of activated carbon, and 18 to 23% by weight of binder with each other.

The titanium oxide may include titanium dioxide or titanium hydroxide.

The titanium dioxide may produce a functional group in which a plurality of oxygen O is covalently bonded to one titanium (Ti).

In one example, sodium orthotitanate ($Na_4TiO_4$) as a kind of titanium oxide may remove heavy metals in water via a chemical reaction formula such as a following reaction formula 1.

$$Na_4TiO_4 + 2Me^{++} \rightarrow Me_2TiO_4 + 4Na^+ \quad (1)$$

In the formula 1, 'Me' means a heavy metal, and the heavy metal is in a state dissolved in water in a form of a water-soluble compound.

Purified water from which the heavy metal (Me) has been removed via the chemical reaction of the water-soluble heavy metal compound and the sodium orthotitanate ($Na_4TiO_4$) as defined above is discharged to the outside of the filter housing 110 through the outlet 112.

In one example, 'Me' may be cadmium (Cd).

In this case, sodium orthotitanate ($Na_4TiO_4$) may remove cadmium (Cd) in water via a chemical reaction formula such as a following reaction formula 2.

$$Na_4TiO_4 + 2Cd^{++} \rightarrow Cd_2TiO_4 + 4Na+ \quad (2)$$

In one example, the titanium hydroxide may remove manganese in water via a chemical reaction formula such as a following reaction formula 3.

$$Mn^{2+} + Ti_2O(OH)_2 \rightarrow Ti_2O(O_2Mn) + 2H^+ \quad (3)$$

Further, the titanium hydroxide may remove zinc in water via a chemical reaction formula such as a following reaction formula 4.

$$Zn^{2+} + Ti_2O(OH)_2 \rightarrow Ti_2O(O_2Zn) + 2H^+ \quad (4)$$

In one example, the titanium oxide may have a granule or powder form, and may be mixed with the materials of the carbon block 121 to constitute the carbon block 121.

Therefore, when water containing heavy metals passes through the filter member 120, the heavy metals in water may be removed therefrom.

Further, the carbon block 121 may further include activated carbon.

The activated carbon may be contained in a form of granules or powders. When, as mentioned above, the carbon block 121 contains the activated carbon, the carbon block 121 may effectively remove residual chlorine components in water while removing heavy metals in water. Accordingly, the taste of the purified water may also be improved.

In addition, chloroform ($CHCl_3$) in water may also be effectively removed by the activated carbon.

The binder connects activated carbon and titanium oxide to each other, and is mixed therewith to impart rigidity to the carbon block.

Due to the binder, activated carbon and titanium oxide may be processed into a block shape having rigidity.

In one example, the filter member 120 may be formed by uniformly mixing the above-described materials with each other and then putting the mixture into a mold and heating the mixture. When the mixture is heated in the mold, the binder, for example, polyethylene (PE) is melted such that activated carbon and titanium oxide are bonded to each other. Accordingly, the carbon block 121 in the form of a block having rigidity as a whole may be formed.

In one example, in general, in the water-purification device, several filters are already installed to remove heavy metals and various foreign substances in water. When the multiple filters are installed, water purification performance may be secured, but the purified-water flow rate may decrease.

Further, the conventional water-purification device has a limited space in which the filters are installed. Thus, it is not easy to add a new filter thereto. Since each of the filters as installed in the water-purification device, for example, the activated carbon filter basically has an individual function for improving water purification performance, it is also not desirable to omit the existing filter in order to add a new filter to the device.

However, according to the present disclosure, activated carbon and titanium oxide may be mixed with each other to constitute the carbon block 121.

Accordingly, without increasing the number of filters, the filer according to the present disclosure may remove heavy metals in water while maintaining the inherent functions and effects of the activated carbon filter installed in the existing water-purification device. Further, since the number of filters is not increased, a decrease in the purified-water flow rate may be prevented.

Hereinafter, a mixing ratio of each of the materials constituting the carbon block and a particle size of each of the materials will be described.

In this embodiment, the carbon block 121 may be produced by mixing 40 to 50% by weight of titanium oxide, 30 to 40% by weight of activated carbon, and 18 to 23% by weight of binder with each other.

In one example, the carbon block 121 may have a total weight of 135 g and may be produced by mixing titanium oxide (in one example, titanium dioxide) 60 g, activated carbon 48 g, binder 27 g with each other.

In this connection, when the ratio of titanium oxide is greater than the above defined ratio, the heavy metal removal performance may be increased, but the purified-water flow rate may be reduced. On the other hand, when the ratio of titanium oxide is smaller than the above defined ratio, the purified-water flow rate may increase, but the heavy metal removal performance may be reduced.

In this embodiment, the mixing ratio of titanium oxide may be variously adjusted according to the type and the ratio of the heavy metals contained in the water during the water purification.

Further, when the ratio of activated carbon is larger than the above defined ratio, it is difficult to secure heavy metal removal performance. When the ratio of activated carbon is smaller than the above defined ratio, it is difficult to remove chloroform and chlorine components in water.

The binder which is essentially used for forming the carbon block is a key material for binding the materials to each other for the block shaping.

However, the specific surface area of the material coupled to the binder may vary depending on the content of the binder, which may affect the carbon block removal performance and the purified-water flow rate.

An existing binder having a high particle size 120 μm allows forming a block only when a content thereof is in a range of 30 to 40% of the total content of the carbon block, which serves as one of the main factors reducing the specific surface area.

However, in accordance with the present disclosure, applying a small particle sized binder instead of the existing binder of the large particle size 120 μm may allow increasing the specific surface area while uniformly dispersing the binder particles and a content thereof is in a range of 18 to 23% of the total content of the carbon block, thereby improving the material adsorption performance and increasing the activated carbon content at the same density to improve the purified water flow rate and the effective amount of purified water.

Thus, according to the present disclosure, while the raw-water flowing into the filter housing 110 passes through the carbon block 121, heavy metals may be removed therefrom and the water may be purified.

Further, the filter member 120 may further include an anion exchange resin non-woven fabric 122 surrounding the outside of the carbon block 121.

When the anion exchange resin non-woven fabric 122 is disposed on an outer face of the carbon block 121, the raw-water flowing into the pre-carbon filter 100 passes through the anion exchange resin non-woven fabric 122 and then through the carbon block 121.

As the raw-water passes through the anion exchange resin non-woven fabric 122, heavy metals such as chromium (Cr) and selenium (Se) may be removed therefrom.

In this connection, the anion exchange resin non-woven fabric 122 may form a stack of several layers to improve the efficiency of removing heavy metals.

According to the above configuration, the raw-water introduced into the pre-carbon filter 100 passes through the anion exchange resin non-woven fabric 122 and then the carbon block 121, and then through a hollow 121a of the carbon block 121, and is discharged out of the pre-carbon filter 100.

Further, the filter assembly 17 may include the hollow fiber membrane filter 200 in which a plurality of hollow fiber membranes 220 are embedded and the post-carbon filter 300 in which the second carbon block 320 having a hollow tube shape is embedded.

Further, when the hollow fiber membrane filter 200 and the post-carbon filter 300 are additionally disposed in the filter assembly 17 as described above, the water introduced into the filter assembly 17 may pass through the pre-carbon filter 100, and then the hollow fiber membrane filter 200 and then the post-carbon filter 300. Thus, the water purification may be performed several times, such that the removal of various foreign substances including heavy metals may be achieved more reliably.

In particular, the post-carbon filter 300 as additionally disposed therein may allow the removal of the chlorine component and chloroform ($CHCl_3$) in water to be achieved more reliably.

In this embodiment, the hollow fiber membrane filter 200 and the post-carbon filter 300 may be accommodated in one filter housing 400 to constitute a composite filter. In this connection, the hollow fiber membrane filter 200 and the post-carbon filter 300 may be arranged in a row so that water that has passed through the hollow fiber membrane filter 200 passes through the post-carbon filter 300.

In detail, the hollow fiber membrane filter 200 may be composed of a first auxiliary filter housing 210 and a hollow fiber membrane 220, and the post-carbon filter 300 may be composed of a second auxiliary filter housing 310 and a second carbon block 320. Further, the auxiliary filter housings 210 and 310 are accommodated inside the filter housing 400.

When the hollow fiber membrane filter 200 and the post-carbon filter 300 are arranged in a row in one filter housing 400, the filtration efficiency may be improved while the purified-water flow rate may be maintained.

Further, without the need to expand the filter installation space formed in the water-purification device, the filter assembly according to the present disclosure may be applied immediately to the device by simply replacing the existing filter with the filer assembly according to the present disclosure.

Further, reducing the volume of the filter may allow increase in the space utilization, and thus to implement a slimmer water-purification device.

According to the above configuration, the raw-water introduced into the water-purification device is purified while the water is passing through the pre-carbon filter 100 and the composite filter 200 and 300.

In detail, the raw-water introduced into the pre-carbon filter 100 is first filtered while passing through the anion exchange resin non-woven fabric 122, and then is second filtered while passing through the carbon block 121 produced by mixing the activated carbon, binder, and titanium oxide with each other. Then, the purified water is discharged out of the pre-carbon filter 100.

Then, the water discharged from the pre-carbon filter 100 flows into the composite filter 200 and 300.

The raw-water introduced into the composite filter 200 and 300 is introduced into the hollow fiber membrane filter 200, and is third filtered while passing through the hollow fiber membrane 220. Thereafter, the water discharged from the hollow fiber membrane filter 200 flows into the post-carbon filter 300, and passes through the carbon filter 320, and thus is fourth filtered, and then is discharged out of the post-carbon filter 300.

Accordingly, the raw-water introduced into the filter assembly 17 may be brought into a purified state in which heavy metals and foreign substances have been removed therefrom while being subject to the plurality of filtration processes as described above.

For reference, when the water is passing through the carbon block 121 produced by mixing the activated carbon, binder, and titanium oxide with each other, 9 kinds of heavy metals, that is, mercury, lead, copper, aluminum, iron, cadmium, arsenic, manganese, zinc may be removed therefrom.

In detail, mercury, lead, iron, aluminum, cadmium, arsenic, and copper may be removed by titanium oxide in the carbon block 121, while manganese, and zinc may be removed by titanium oxide in the carbon block 121.

For reference, in the removal of manganese and zinc contained in water, based on a chemical reaction such as a following reaction formula 5, manganese and zinc may be ion-adsorbed onto the titanium dioxide ($TiO_2$) and thus may be removed from water.

(5)

Further, in the removal of selenium, based on a chemical reaction such as a following reaction formula 6, selenium may be ion-adsorbed onto the titanium dioxide ($TiO_2$) and thus may be removed from water.

(6)

In addition, in accordance with the present disclosure, the smaller particle sized binder whose size is reduced to about 1/4 size of the conventional binder particle size may be added to the block. Further, the mixing amount of the binder is reduced to about 1/2 of the mixing amount of the conventional binder, such that only about 18 to 23% of the binder may be added thereto. Thus, the mixing ratio of activated carbon and titanium oxide may increase, thereby lowering the overall density of the filter and improving the treatment amount. Further, as, at the same volume of the block, the contents of activated carbon and titanium oxide increase, thereby improving the removal of the heavy metals.

In detail, in order to improve the functions of the activated carbon and the heavy metal removal material of the carbon block 121, when the carbon block 121 is produced, the smaller particle sized binder may be added. Thus, the materials may be uniformly mixed with and bonded to each other at a small amount of the binder, such that the specific surface area may increase, thereby to increase the heavy metal removal performance, the effective purified-water amount, and the purified water flow rate.

Figure 5:
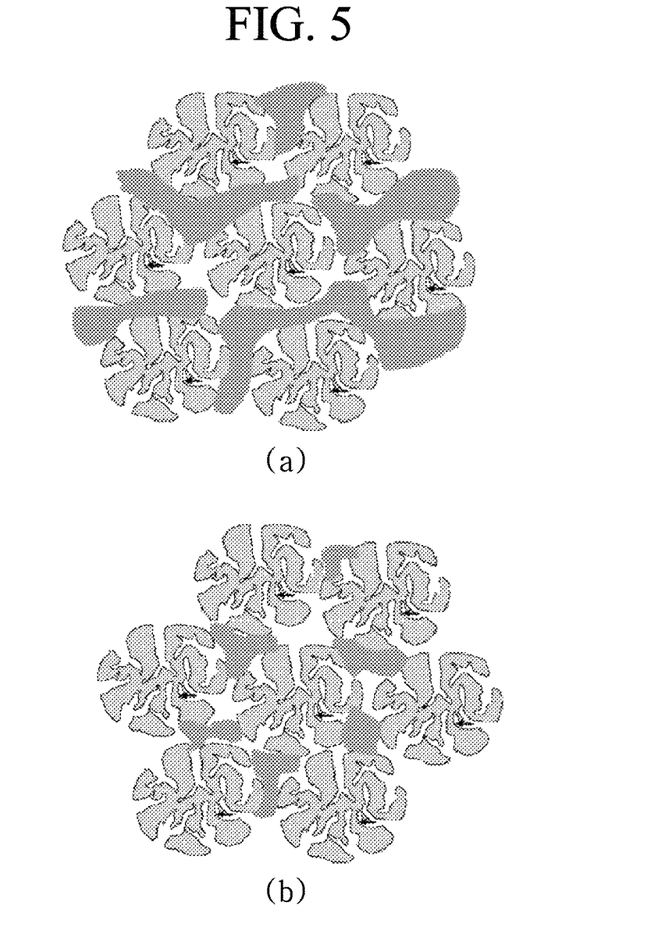
FIG. 5 to FIG. 6 are a comparison view of surfaces of the carbon blocks based on a difference between the particle sizes of the binders.
Figure 6:
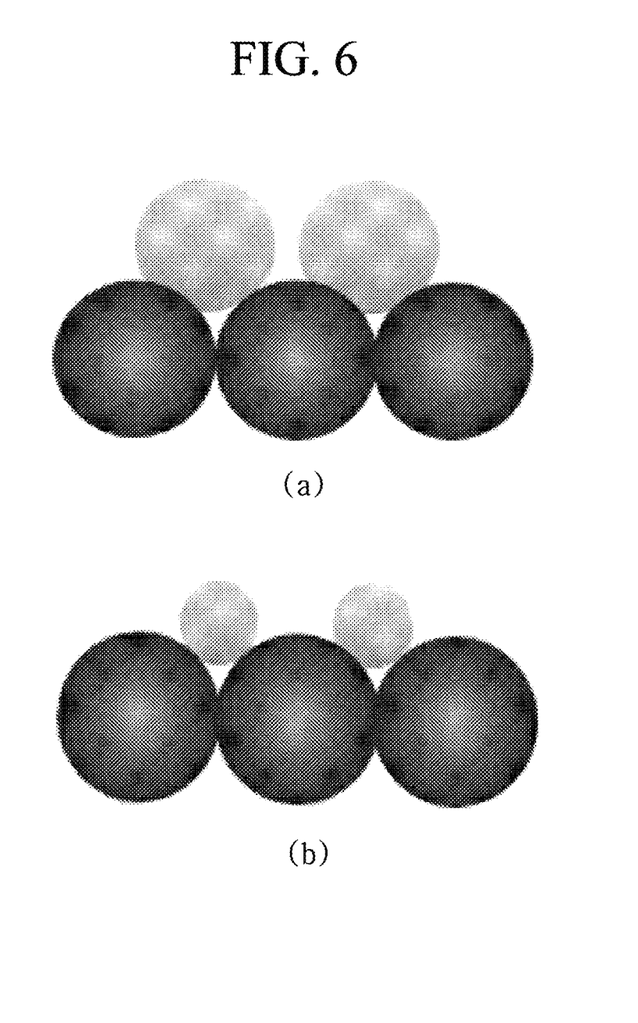

FIG. 5 to FIG. 6 are a comparison view of surfaces of the carbon blocks based on a difference between the particle sizes of the binders.

(a) in FIG. 5 and (a) in FIG. 6 are views analyzing the surface of the carbon block when the binder particle size is 120 μm, while (b) in FIG. 5 and (b) in FIG. 6 are views analyzing the surface of the carbon block when the binder particle size is smaller than 120 μm.

Referring to FIG. 5 to FIG. 6, when the particle size of the binder is smaller than 120 μm, the binder particles are uniformly dispersed, and thus the activated carbon and titanium oxide may be bonded to each other at a smaller amount of the binder, so that the mixing amount of the binder may be reduced.

Further, as the binder mixing amount is lowered, the mixing amounts of the activated carbon and titanium oxide may increase, such that the specific surface area thereof may be increased, and as a result, the heavy metal removal performance may be improved. Further, as the mixing ratio of the binder decreases, the water permeability and the effective purified-water amount may be increased.

Figure 7:
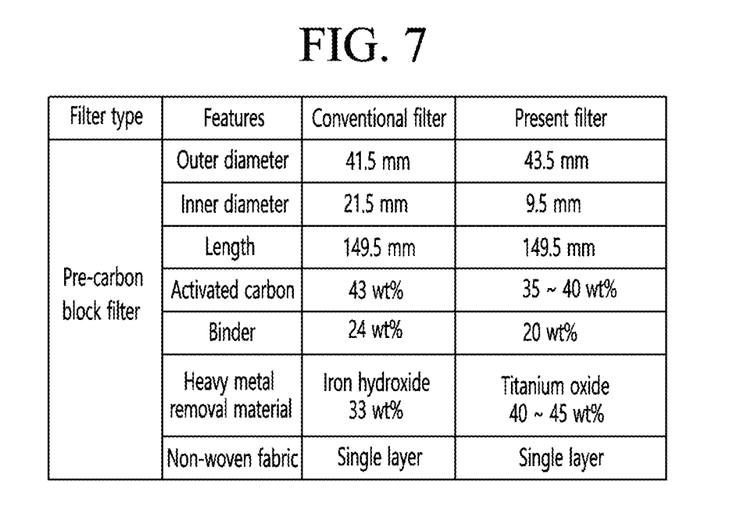
FIG. 7 is a table comparing specifications of a carbon block applied to a filter according to the present disclosure and a conventional carbon block.
Figure 8:
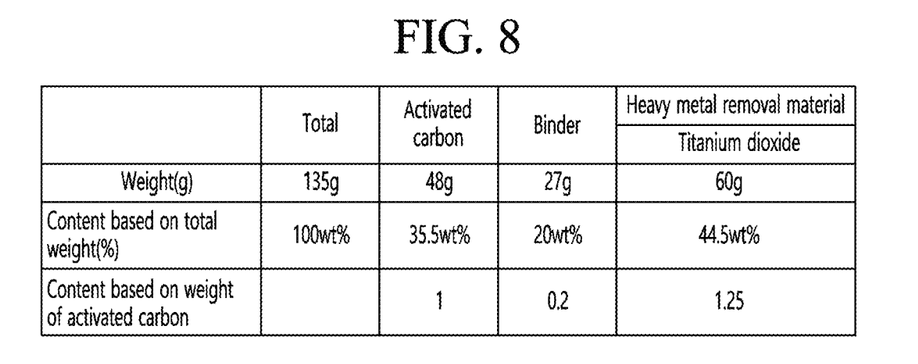
FIG. 8 is a table showing a composition ratio of the carbon block applied to the filter according to the present disclosure.
Figure 9:
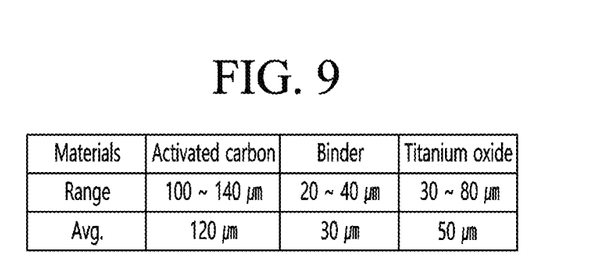
FIG. 9 is a table showing a particle size of each of materials of the carbon block applied to the filter according to the present disclosure.

FIG. 7 is a table comparing the specifications of the carbon block applied to the filter according to the present disclosure and the conventional carbon block. FIG. 8 is a table showing the composition ratio of the carbon block applied to the filter according to the present disclosure. FIG. 9 is a table summarizing the particle size of each of the materials of the carbon block applied to the filter according to the present disclosure.

Referring to FIG. 7 to FIG. 9, a ratio of the inner diameter (ID) of the carbon block 121 (see FIG. 3) and the outer diameter (OD) thereof (see FIG. 3) may be in a range of 1:3 to 1:5.

That is, compared to the conventional block, the outer diameter (OD) of the carbon block 121 (see FIG. 3) may be larger, and the inner diameter (ID) thereof (see FIG. 3) may be smaller, and thus the carbon block 121 may be formed to be thicker.

Further, the binder may include polyethylene (PE), and may have the smaller particle size.

Further, the average particle size of the titanium oxide may be smaller than the average particle size of the activated carbon, and the average particle size of the binder may be smaller than the average particle size of the titanium oxide.

In one example, the titanium oxide may have an average particle size of about to 80 µm, while the average particle size of the titanium oxide may be about 50 µm.

Alternatively, the activated carbon may have an average particle size of about 100 to 140 µm, while the activated carbon may have an average particle size of about 120 µm.

Alternatively, the binder may have an average particle size of about 20 to 40 µm, while the average particle size of the binder may be about 30 µm.

Further, the filter member includes a carbon block produced by mixing titanium oxide, activated carbon, and binder with each other, wherein the mixed weight of the titanium oxide may be in the range of 120% to 140% of the mixed weight of the activated carbon.

Further, the filter member includes a carbon block produced by mixing activated carbon, binder, and titanium oxide with each other, wherein the mixed weight of titanium oxide may be the largest, the mixed weight of the activated carbon may be larger than the mixed weight of the binder, and the mixed weight of the binder may be the smallest.

Further, the filter member includes a carbon block produced by mixing activated carbon, binder, and titanium oxide with each other, wherein a content of the binder may be in a range of 15 to 25% of the total weight of the carbon block.

Further, the filter member includes a carbon block produced by mixing activated carbon, binder, and titanium oxide with each other, wherein the mixed weight of the binder is in the range of 40% to 50% of the mixed weight of the titanium oxide.

Thus, when the ratio of the content of the binder to that of activated carbon or titanium oxide decreases, the removal of heavy metals such as arsenic, manganese, and zinc may increase.

Figure 10:
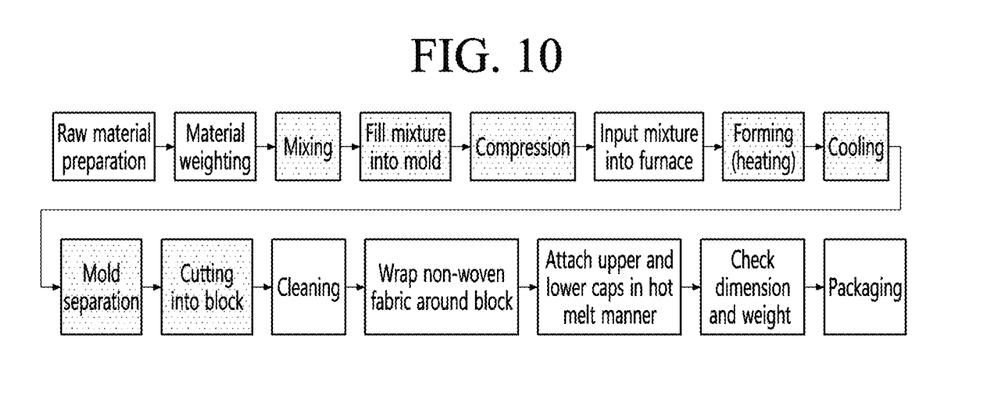
FIG. 10 is a block diagram illustrating a production process of the carbon block applied to the filter according to the present disclosure.

FIG. 10 is a block diagram illustrating the production process of the carbon block applied to the filter according to the present disclosure.

Referring to FIG. 10, first, the materials constituting the carbon block 121 may be mixed with each other based on mixing ratios thereof as defined above to produce a carbon block mixture.

In one example, the carbon block mixture may be produced by mixing activated carbon 48 g, binder 27 g, and titanium oxide 60 g with each other. Further, the binder may have a particle size lower than that of titanium oxide.

Then, the evenly mixed carbon block mixture may be received in a mold and may be subject to a compression process therein and may be put into an electric furnace.

The heating of the block mixture proceeds. In the heating process, the binder, for example, polyethylene (PE) is melted so that activated carbon, titanium oxide, and binder are integrally bonded to each other, such that the carbon block 121 having a hollow tube shape having rigidity as a whole may be shaped.

Further, after the heating, the cooling process proceeds. When the cooling is finished, the mold is separated from the shaped block.

Further, the carbon block having a hollow tube shape and separated from the mold may be cut into a unit length.

Further, the carbon block that has been cut into the unit length may be cleaned via compressed air injection thereto.

Then, the non-woven fabric may wrap around the carbon block, and then the upper and lower caps may be attached thereto in a hot melt scheme.

Thereafter, the dimensions and weight, etc. of the block may be examined. When there is no abnormality thereof, the block may be subject to a packaging process.

The present disclosure may realize the filter for a water-purification device which may employ a smaller particle sized binder such that the binder mixing ratio may be reduced by about a half, and may realize the water-purification device including the same.

The present disclosure may realize the filter for a water-purification device in which the particle size of the binder is reduced, the binder content is reduced, uniform dispersion is possible, and a specific surface area of the heavy metal removal material is increased accordingly, and thus the heavy metal removal performance is improved, and may realize the water-purification device including the same.

The present disclosure may realize the filter for a water-purification device in which the particle size of the binder is reduced, the binder content is reduced, and uniform dispersion is possible, and the purified water flow rate is increased accordingly, and the effective purified-water amount is improved, and may realize the water-purification device including the same.

The present disclosure may realize the water-purification device in which the water purification process is performed several times using a plurality of filters, so that the removal of various foreign substances including heavy metals may be more reliably performed.

The present disclosure may realize the filter for a water-purification device capable of removing heavy metals such as lead, mercury, arsenic, iron, aluminum, copper, and cadmium in water while securing treatment capacity and may realize the water-purification device including the same.

What is claimed is:

1. A filter device of a water-purification apparatus, comprising:
   a pre-filter including a first carbon block, the first carbon block having a hollow tube shape;
   a fiber membrane filter configured to receive water from the pre-filter; and
   wherein the first carbon block comprises 40 to 50% by weight of titanium dioxide, 30 to 40% by weight of activated carbon, and 18 to 23% by weight of a binder.

2. The filter device of claim 1, wherein the fiber membrane filter comprises a plurality of hollow fiber membranes and a second carbon block.

3. The filter device of claim 2, wherein the second carbon block has a hollow tube shape.

4. The filter device of claim 2, wherein the second carbon block includes activated carbon and is configured to remove chloroform ($CHCl_3$) from the water received from the pre-filter.

5. The filter device of claim 2, further comprising a filter housing that accommodates the plurality of hollow fiber membranes and the second carbon block.

6. The filter device of claim 5, wherein the plurality of hollow fiber membranes and the second carbon block are arranged inside the filter housing along a longitudinal direction of the filter housing.

7. The filter device of claim 5, wherein the filter housing comprises:
- a first auxiliary filter housing that is disposed in the filter housing and accommodates the plurality of hollow fiber membranes; and
- a second auxiliary filter housing that is disposed in the filter housing and accommodates the second carbon block.

8. The filter device of claim 7, wherein the first auxiliary filter housing and the second auxiliary filter housing are arranged inside the filter housing along a longitudinal direction of the filter housing, and
wherein the second auxiliary filter housing is disposed between an inlet of the filter housing and the first auxiliary filter housing along the longitudinal direction.

9. The filter device of claim 1, further comprising:
- a first filter housing that accommodates the pre-filter; and
- a second filter housing that is spaced apart from the first filter housing and accommodates the fiber membrane filter.

10. The filter device of claim 9, wherein the fiber membrane filter comprises a plurality of hollow fiber membranes and a second carbon block, and
wherein the filter device further comprises:
- a first auxiliary filter housing that is disposed in the second filter housing and accommodates the plurality of hollow fiber membranes; and
- a second auxiliary filter housing that is disposed in the second filter housing and accommodates the second carbon block.

11. The filter device of claim 10, wherein the first auxiliary filter housing and the second auxiliary filter housing are arranged inside the second filter housing along a longitudinal direction of the second filter housing.

12. The filter device of claim 11, wherein an outer circumferential surface of the first auxiliary filter housing and an outer circumferential surface of the second auxiliary filter housing are spaced apart from an inner circumferential surface of the second filter housing in a radial direction.

13. The filter device of claim 12, wherein a radial distance between the outer circumferential surface of the first auxiliary filter housing and the inner circumferential surface of the second filter housing is greater than a radial distance between the outer circumferential surface of the second auxiliary filter housing and the inner circumferential surface of the second filter housing.

14. The filter device of claim 1, wherein the binder is made of polyethylene (PE).

15. The filter device of claim 1, further comprising an anion exchange resin non-woven fabric that surrounds an outer surface of the first carbon block.

16. The filter device of claim 1, wherein the first carbon block consists of the titanium dioxide, the activated carbon, and the binder.

17. The filter device of claim 1, wherein the titanium dioxide in the first carbon block is configured to react with manganese (Mn).

18. The filter device of claim 1, wherein the titanium dioxide in the first carbon block is configured to react with selenium (Se).

19. A water-purification apparatus comprising:
- a filter assembly configured to receive a filter device;
- a water supply line configured to carry water having passed through the filter device; and
- a water supply valve disposed at the water supply line,
wherein the filter device comprises:
  - a pre-filter including a first carbon block, the first carbon block having a hollow tube shape;
  - a fiber membrane filter configured to receive water from the pre-filter; and
  - wherein the first carbon block comprises 40 to 50% by weight of titanium dioxide, 30 to 40% by weight of activated carbon, and 18 to 23% by weight of a binder.

20. The water-purification apparatus of claim 19, wherein the fiber membrane filter comprises:
- a plurality of hollow fiber membranes and a second carbon block, the second carbon block having a hollow tube shape; and
- a filter housing that accommodates the plurality of hollow fiber membranes and the second carbon block therein.

* * * * *